Nov. 19, 1935.   H. G. BARTHOLOMEW ET AL   2,021,474
PHOTOTELEGRAPHY
Filed Dec. 23, 1930   5 Sheets-Sheet 1

INVENTORS
Harry Guy Bartholomew
and John Willey Dalton
By Ramsey & Kent
their ATTORNEYS

Nov. 19, 1935.  H. G. BARTHOLOMEW ET AL  2,021,474

PHOTOTELEGRAPHY

Filed Dec. 23, 1930   5 Sheets-Sheet 2

INVENTORS
*Harry Guy Bartholomew*
*and John Willey Dalton*
By *Ramsey & Kent*
their ATTORNEYS

INVENTORS
*Harry Guy Bartholomew*
and *John Willey Dalton*
By *Ramsey & Kent*
their ATTORNEYS Patented Nov. 19, 1935

2,021,474

UNITED STATES PATENT OFFICE 2,021,474

PHOTOTELEGRAPHY

Harry Guy Bartholomew and John Willey Dalton,
London, England

Application December 23, 1930, Serial No. 504,240
In Great Britain March 22, 1930

11 Claims. (Cl. 178—6)

This invention relates, broadly, to apparatus adapted for use in telegraphy and telephony and in other connections in which an effect or result is to be produced which is dependent upon the variation in relationship of the intensity of two electric currents and particularly where, as in the reception of radio telephonic or radio telegraphic signals, the result should depend upon the instantaneous relation of the intensity of the current set up by a received signal with a standard corresponding with the energy emitted from the transmitting station and in which variations in the received energy from the standard may occur, for instance, in consequence of fading.

The invention relates more particularly to photo-telegraphy and television where, as will be understood variation in the received energy from causes such as unintentional fluctuations in the energy transmitted from the transmitting station or fading or in which variation in the energy output of the receiving station controlled by the received signal otherwise arising from causes outside the control of the receiving or transmitting station, would result in falsification in the result.

One method of photo-telegraphy to which the present invention in particular relates is that in which, at the transmitting station, the original is scanned and an intermediate record is formed which is not the visual equivalent of the original and may be, for instance, a punched or perforated tape of the kind used in the operation of or formed by standard telegraphic machines.

The invention also extends to other methods of photo-telegraphy, for instance, those in which at the transmitting station the original is scanned and the signals produced as the result of such scanning are transmitted to the receiving station by line telegraphy or telephony or by radio telegraphic or telephonic methods and the signals received by the receiving station are employed in forming, with or without the production of an intermediate record, a representation of the original.

The invention consists, broadly, in apparatus, the electrical output of which varies in accordance with the instantaneous ratio or relation of the values of the energy supplied from the two sources.

The invention also consists, broadly, in the method of securing an output of electrical energy, the instantaneous value of which is dependent upon the relation between the instantaneous values of the two inputs in such manner that undesired or accidental variations in value of one of the inputs from a standard will be substantially of no effect upon the value of the output and the invention extends broadly, to apparatus for carrying this method into effect.

As applied to photo-telegraphy in which an original is scanned with the aid of a beam of light in such manner that differences in tone of successive areas of the original influence a light sensitive cell in varying degrees the invention comprises controlling a device adapted to form a visual record or reproduction of the original or an intermediate record which may be punched on perforated tape with the aid of which a visual reproduction of the original may be produced in accordance with the variations in the degree in which the light sensitive cell is so influenced.

For instance, in accordance with the invention, as applied to photo-telegraphy light transmitted through or reflected from successive small areas of an original is caused to act upon a light sensitive cell and the light directly projected upon the original is also caused to influence the same or another light sensitive cell, the instantaneous ratio or relation between the magnitude of the current set up or permitted to flow by the projected and reflected or transmitted light being employed for controlling the operation of the record forming device adapted to form on a record receiving member signs or signals or indications corresponding with the tones of the successive area of the original form or through which light is transmitted or reflected.

The record forming device may be of such character as to produce a visual representation of the original or it may be of a character to produce a record which is not a visual representation of the original but is an intermediate record in the form, for instance, of punched or perforated tape of a character adapted to be employed in the operation of a standard telegraphic machine or is an intermediate record which is otherwise adapted for controlling telegraphic or telephonic apparatus in communicating signals to a receiving station by line currents or by radio telegraphic or telephonic means and which may be thus employed in the production of a visual representation of the original.

For instance, in accordance with the invention, the original may be scanned by a pencil or beam of light interrupted at a desired frequency, the light transmitted through or reflected from the original being caused to act upon a light sensitive cell, the flow of current through which is amplified and employed in the control of a record forming device to form in a record receiving member, signs, signals or indications corresponding with the tones of the successively illuminated areas of the original.

The amplified current may be employed at the transmitting station in the operation of a device adapted to form an intermediate record which is not the visual equivalent of the original or it may be employed in directly controlling line or radio telegraphic or telephonic transmitter and the signals thus transmitted to the receiving station may be employed in forming a visual representation of the original.

As variation in the intensity of the illumination of the original will occur as the result of even small variations in voltage of the current supplied to the source of illumination and as variations in voltage of the current supplied to the light sensitive cell and to the amplifying device associated therewith will result in variation in the energy supplied to the relays independently of the variation in the tones of the successive areas of the original which is being scanned, errors in the intermediate record are liable to occur and a further object of the invention is to provide means whereby the possibility of such errors occurring is reduced or minimized.

With this object in view, the invention comprises controlling the operation of the recording means by energy proportionate with the light reflected from or transmitted through the successive small areas of the original and in addition and simultaneously by energy proportionate with the light incident upon or illuminating such small areas.

This phase of the invention may be stated to comprise controlling the recording means by balancing an amount of energy proportionate with the light reflected from or transmitted through successive small areas of the original against an amount of energy proportionate with the light incident upon or illuminating such small areas.

Thus, energy proportionate with the light reflected from or transmitted through successive small areas of the original and energy proportionate with the light incident upon or illuminating such small areas may be supplied to a bank of relays differentially adjusted to be actuated in accordance with the degree of intensity or magnitude of the currents supplied and thereby to control the operation of the record forming device which may be of a character adapted to form an intermediate record which is not the visual equivalent of the original or is a record in the form of a visual representation of the original.

The energy supplied to the relays will normally be amplified and as variations in the degree of amplification may arise in the amplifier due, for instance, in the case of a valve amplifier to variations in the high tension or low tension voltages applied to the valves, preferably in accordance with the invention the energy proportionate with the light reflected from or transmitted through the successive small areas and the energy proportionate with the light incident upon or illuminating such small areas is fed to the same amplifier. In such case, the energy from the two sources may be applied to the amplifier as electrical energy at different frequencies and a filter circuit is associated therewith in order to separate the amplified currents.

Generally, it will be found desirable to supply to a single light sensitive cell both the light reflected by or transmitted through the successive small areas and light porportionate with that coming from the source of illumination incident upon such areas.

Moreover, it is generally desirable or convenient that the light proportionate with that incident upon such areas as well as the light which is reflected from or transmitted through the said areas shall come from a common source or, in other words, from a single lamp, although, as will be understood, it will be possible to employ two electric lamps of similar characteristics and arranged in the same circuit, one for illuminating the successive areas of the original and the other for directly illuminating the light sensitive cell.

To obtain electric energy at two frequencies an interrupter may be arranged in the paths of light to the light sensitive cell and as interrupter a disc provided with two series of holes, the holes of the one series being spaced differently from the holes of the other series, associated with a source of illumination and with an optical system adapted to project one beam through one series of holes and another beam through the second series of holes, may be employed.

Alternatively, one or more sources of illumination which are adapted to provide an interrupted or intentionally varied degree of illumination, for instance, neon or other lamps associated with means adapted to control the intensity of light emitted by them at a desired frequency may be used.

As applied to a device adapted to form an intermediate record in the form of a punched tape, the invention comprises the arrangement of the relays in the circuit of the several punch magnets of the perforator, the current for actuating the relays being supplied thereto through a potentiometer resistance so that according to the tone of a given small area the requisite number of punches will be actuated.

For instance, in one construction in accordance with the invention with a common source of light there are associated two optical systems and an interrupter disc provided with two series of holes, the holes of one series being spaced differently from the holes of the other series, the disc being adapted to be rotated at a constant speed. One of the optical systems is arranged to project a pencil of light upon a cylinder or the equivalent with which the original representation to be operated upon is associated, the original being of such character that light may be transmitted therethrough or reflected therefrom on to a light sensitive cell on to which a beam of light from the other optical system is also projected.

This light sensitive cell is arranged in association with a valve amplifier, the output of which may be connected with two frequency filters and with which if necessary are associated rectifiers or smoothing circuits, one of the frequency filters being connected to a restraining winding in each of a plurality of relays arranged in the local circuit of the magnets of a machine perforator, while the other frequency filter is arranged in circuit with a tone-setting potentiometer from which tappings are taken to the respective actuating windings of the relays.

With this arrangement as will be understood, the several relays will be operated not mainly by the magnitude of the instantaneous value of current proportionate with the amount of light reflected from a given small area, but in accordance with the ratio of the amount of light incident upon the particular small area, and consequently, should the amount of incident light increase or diminish or the value of the energy set up thereby increase or diminish, in the first case by variation in the intensity of the illumination or in the other case by the degree of amplification, the resultant current will set up a correspondingly varying resistance to the actuation of the relay, while as the amount of light reflected from a given small area will increase or diminish proportionately with the variation in intensity of the incident light, the current passing to the actuating winding of the relay will be correspondingly varied.

Certain contructions of apparatus in accordance with the invention are illustrated by way of example in the accompanying drawings, in which.

Figure 1:
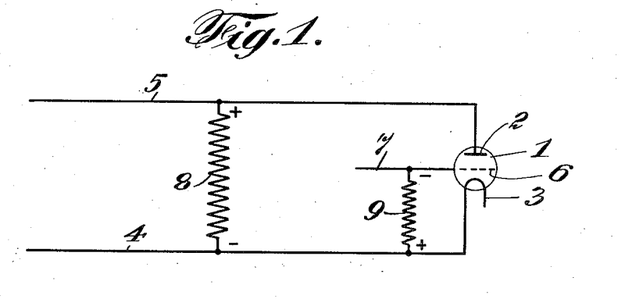
Figure 1 illustrates a device in which both of the inputs of electrical energy are in the form of direct current.
Figure 4:
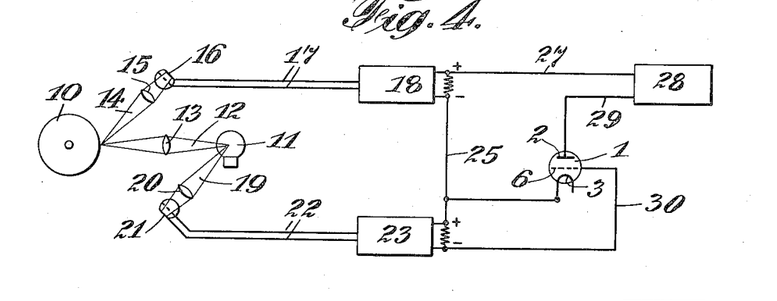
Figure 4 illustrates an apparatus for use in photo-telegraphy in which both of the inputs are direct current and this construction comprises an element of the character illustrated in Figure 1.

Referring to Figures 1 and 4, a triode valve 1 having a plate 2 and a filament 3 has an input lead 4 connected to the filament 3 and an input lead 5 connected to the plate 2, while the other of the input leads is connected to the grid 6 by way of the circuit through the leads 4 and 7, the two input circuits being applied to the elements of the valve respectively across the resistances 8 and 9.

The output of the valve 1 will vary with such an arrangement not directly in accordance with variation in the input applied by way of the leads 4 and 5 but in accordance with the instantaneous ratio or relation between the plate voltage and grid voltage.

Referring to Figure 4, a cylinder 10 bearing the original (which may comprise picture, drawing, map or other object) to be scanned, is rotated at a uniform speed and caused to travel relatively to a beam of light projected on to the original from the source of light 11.

In this construction, a pencil of light rays 12 is projected through a lens 13 upon the original and the reflected beam 14 passes through the lens 15 on to the light sensitive cell 16 which is connected by the leads 17 with an amplifier 18. A pencil of rays 19 is also projected through the lens 20 on to the light sensitive cell 21 connected by the leads 22 with the amplifier 23, one lead 24 from the output of which as well as one lead from the output of the amplifier 18 by way of the lead 25 of the amplifier 18 is connected by the lead 26 to the filament 3 of the triode valve. The other lead from the amplifier 18 is connected through the lead 27 with the light tone recording apparatus 28 in turn connected by the lead 29 with the plate 2 of the triode valve, the grid 6 of which is connected by the lead 30 with the negative terminal of the output of the amplifier 23.

As will be appreciated, the recording apparatus may be of any convenient form and it will be operated not proportionately with the instantaneous value of the current supplied to the amplifier 18 but in accordance with the instantaneous ratio of the value of the current supplied to the amplifier 18 and the value of the current supplied to the amplifier 23.

Figure 2:
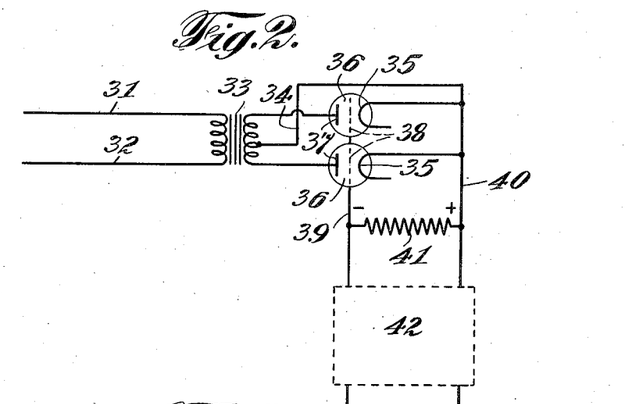
Figure 2 illustrates an arrangement where both of the inputs of electrical energy are in the form of alternating current, or one of the inputs is in the form of alternating current the other of the inputs being in the form of direct current, the output being in both cases direct current.

Referring to Figure 2, alternating current is supplied to the leads 31 and 32 of the primary of the transformer 33, and the mid point of the secondary of this transformer is connected with the lead 34 with the filament 35 of the two half wave rectifying valves 36, 36, the ends of the secondary transformer winding being connected to the plates 37, 37 of these two valves.

The grids 38, 38 of the valves 36 are connected together and to the lead 39 between which and the lead 40 a resistance 41 is arranged, the lead 40 being in turn connected with the filament 35 of the valves. The current supplied from a second source of alternating current is rectified by means of a rectifier 42.

Figure 5:
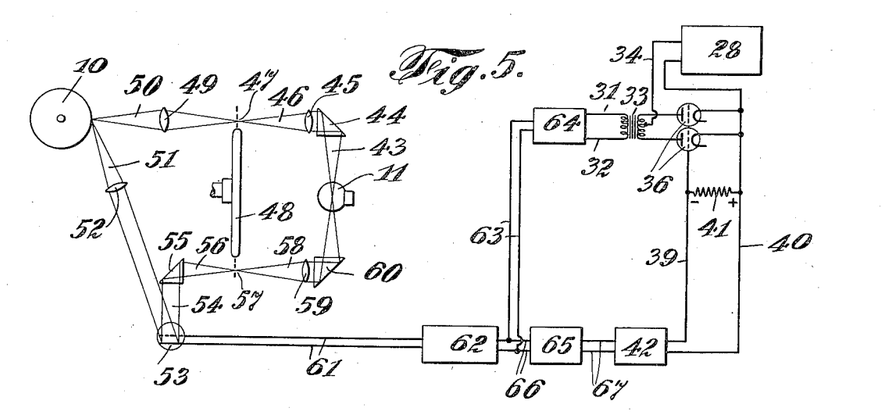
Figure 5 is a corresponding view of an apparatus for use in photo-telegraphy comprising an element as illustrated in Figure 2.

One application of the arrangement shown in Figure 2 may be understood by reference to Figure 5 which, as above indicated, illustrates the application of the apparatus to photo-telegraphy. In Figure 5, the cylinder 10 carries the original so that it may be scanned by light emitted from the source of light 11. With this construction, a pencil of rays 43 from the source of light is caused to fall upon the prism 44 by which it is reflected through the lens 45 forming a pencil of rays 46. This pencil of rays is arranged to pass through one of a series of holes 47 adjacent to the periphery of the rotating disc 48 and the light passing through the holes of this series is concentrated by the lens 49 to form a pencil of rays 50 projected upon the original supported on the drum 10, the light reflected therefrom forming a pencil of rays 51 which passes through an optical system 52 on to the light sensitive cell 53. Onto the light sensitive cell a beam of light 54 is projected by the prism 55 arranged in the path of the pencil of rays 56 formed by the light passing through a second series of holes 57 arranged adjacent to the periphery of the rotating disc 48. The pencil of rays 56 arises from the interruption of the beam of light 58 which is projected on to the disc 48 by the optical system 59 arranged in association with the prism 60 which reflects a portion of the light coming from the source 11.

The holes of the two series are spaced differently so that when the disc 48 is rotated, two light beams of different frequencies are produced and alternating currents of two frequencies are set up by the beams of light through the two series falling upon the light sensitive cell 53.

As stated, alternating or interrupted currents of two different frequencies will be produced and the current of these two frequencies will pass by way of the lead 61 to the amplifier 62 which will be of a type adapted to function equally as an amplifier for the two frequencies. The output of this amplifier is connected by leads 63 with the filter 64 which passes the current of one frequency. The output of the amplifier is also connected by leads 66 with the filter 65 which passes the current of the other frequency, and the output of this filter 65 is connected by the leads 67 with a rectifier 42.

The remaining elements shown in this Figure 5 correspond in character and arrangement with the elements illustrated in Figure 2 except that in the connection between the mid point of the transformer 33 and the filament of the valves there is interposed a light tone recording device 28, which may be photographic, mechanical to punch a tape, or of any well known form.

Figure 3:
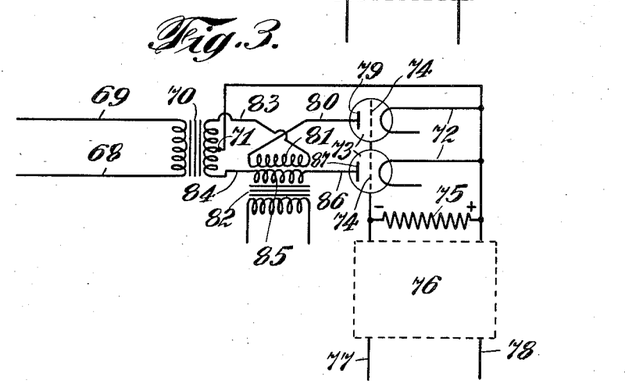
Figure 3 is an arrangement in which both of the inputs and the output are in the form of alternating current.

Referring to Figure 3, 68 and 69 represent the input leads of alternating current from one source, which is caused to flow through the primary of a transformer 70, the mid point of the secondary of which is connected by the lead 71 with the filaments 72 of the triode valves 73, 73. Between the grids 74, 74 which are connected together and the filament leads, which are also connected together, direct current is supplied across the resistance 75 from the rectifier 76 which is supplied through the leads 77 and 78 with alternating current from a second source. The plate 79 of one of the valves is connected by the lead 80 with one of the primaries 81 of the transformer 82, the other end of this primary 81 being connected by the lead 83 with one end of the secondary of the transformer 70. The other end of this secondary of transformer 70 is connected by the lead 84 with the second primary 85 of the transformer 82, while the other end of the second primary 85 is connected by the lead 86 with the plate 87 of one of the valves 73, the output of the secondary of the transformer 82 being indicated by the reference 88 (Fig. 6).

Figure 6:
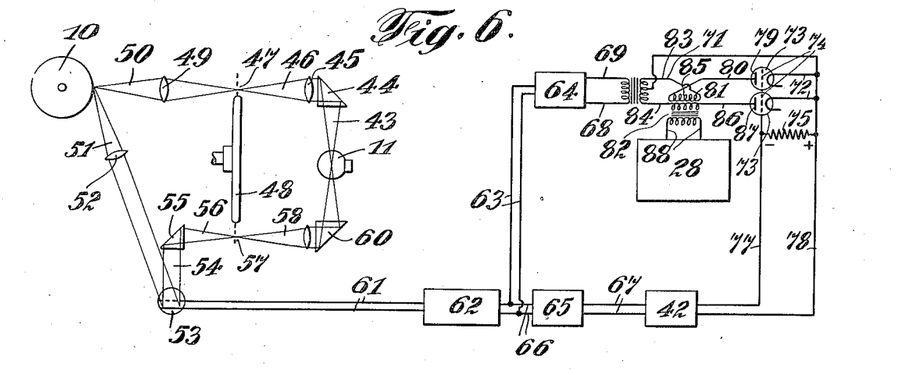
Figure 6 is an apparatus for use in photo-telegraphy comprising an element of the character illustrated in Figure 3.

Figure 6 illustrates an apparatus for use in photo-telegraphy, comprising a circuit as shown in Figure 3. In the apparatus shown in Figure 6, the cylinder 10 upon which the original is mounted and, the arrangement for projecting light on to the surface of the original and for projecting light directly on to the light sensitive cell, as well as the amplifiers and rectifiers correspond with that described in connection with Figure 5, but in this arrangement shown in Figure 6 the recording device 28 of the character specified is connected with the leads 89 from the transformer 82, the arrangement of which has been described with reference to Figure 3.

Figure 7:
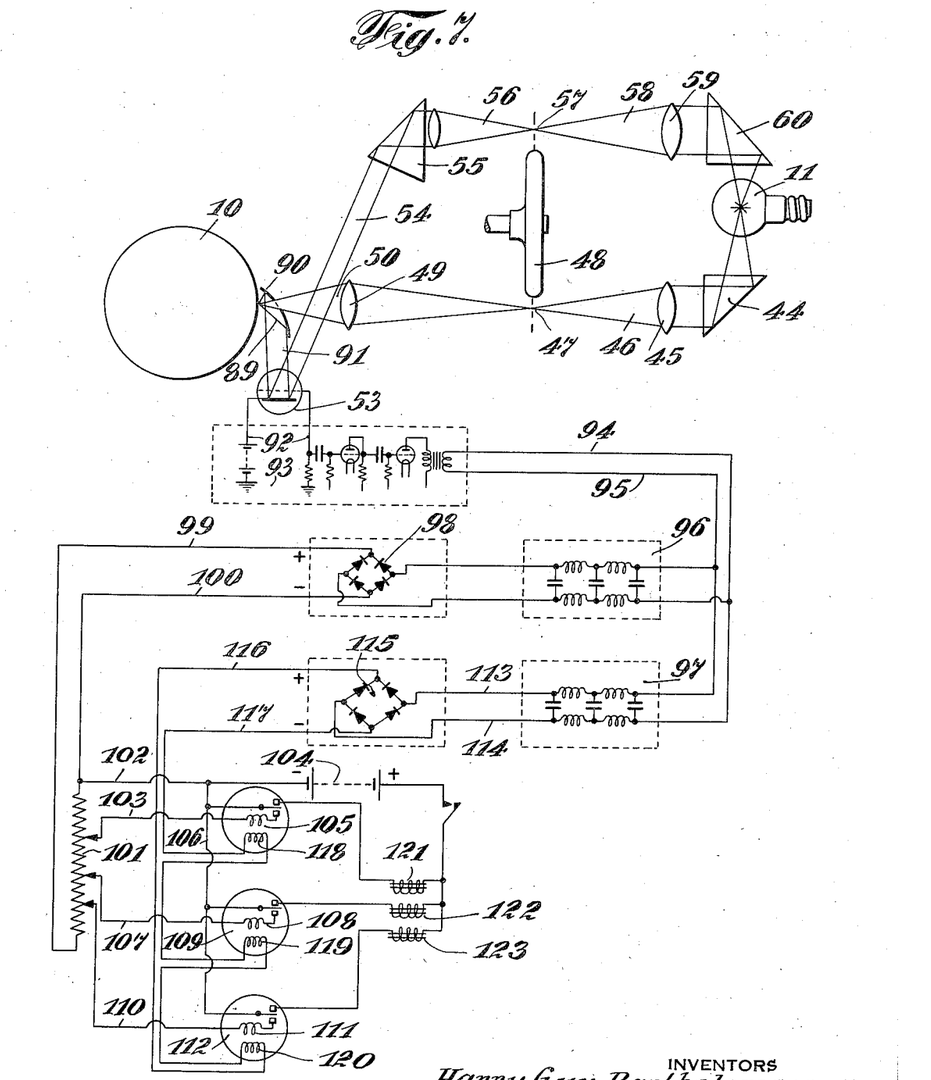
Figure 7 illustrates an alternative form of apparatus in accordance with the invention.

Referring to Figure 7, 10 is the cylinder upon which the original to be operated upon is mounted, and the arrangement for producing an interrupted beam of light is the same as for the corresponding beam in Figures 5 and 6, namely, 11 is the source of light with which, as in the preceding construction, there is associated the prism 44 and the lens system 45 projecting a pencil of rays 46 on to the portion of the interrupter disc 48 in which is arranged a series of holes 47, the light passing through the holes of this series being in turn passed through the lens 49 and forming a pencil of rays 50 which is projected upon the successive small areas of the original mounted upon the cylinder 10.

From the surface of the original is reflected a beam 89 on to the reflector 90 by which the beam 91 is projected upon the light sensitive cell 53 and also on to this cell is projected a beam of light 54 reflected from the prism 55 arranged in the path of the pencil of rays 56 formed by the light passing through a second series of perforated holes 57 arranged adjacent to the periphery of the rotating disc 48. The pencil of rays 56 arises from the interruption of the beam of light 58 which is projected on to the disc 48 by the optical system 59 arranged in association with the prism 60 which reflects a portion of the light coming from the source 11.

As in the preceding construction, the holes of the two series are spaced differently and thus alternating currents of two frequencies are set up by the passage of light through the two sets of holes and on to the light sensitive cell 53.

The light sensitive cell 53 in this construction, shown in Figure 7, is connected by the leads 92 to the valve amplifier 93, the output leads 94, 95 of which are connected with a frequency filter 96 which is adapted to pass the amplified current corresponding with the light passing direct to the light sensitive cell, and also with a frequency filter 97, which passes the amplified current reflected from the original. The frequency filter 96 is connected with the rectifier 98 which in turn by the leads 99, 100 is connected by the tone setting potentiometer 101 from which leads 102, 103 extend, the former being connected with a local battery 104 and the latter with a winding 105 of the relay 106.

The lead 107 from the potentiometer extends to the winding 108 of the relay 109, while the lead 110 is connected with the winding 111 of the relay 112. The leads 113 and 114 from the filter 97 are connected with the rectifier 115 which in turn is connected by the leads 116, 117, with winding 118 of the relay 106, the winding 119 of the relay 109 and the winding 120 of the relay 112.

The two windings of each of these relays are arranged to act in opposition and, consequently, the moving element of the relays is actuated by the difference in the value of the fields set up by these windings and not solely by the absolute value of one of the fields.

The relays, as will be seen, are arranged in the circuit connecting the battery 104 with a means for making an intermediate record, such as for example, perforator punch magnets 121, 122 and 123 beneath which is fed a tape, as is well known in the art. One or more or particular combinations of these punch magnets are operated in accordance with the light tone or shade of the particular area of the original which is, at a given moment, being illuminated and the operation of the punches will form in a strip of paper used for making the intermediate record, successive series of holes, the combinations and arrangements of each of which series will depend upon the light tone of the several successive areas of the original being scanned.

In connection with the arrangements illustrated in Figures 4 to 7, it may be pointed out that, while, as may appear from the drawings, the record forming device is located at the station at which the original is being operated upon, the record forming device which may make either a final or an intermediate record, may be connected with the other elements of the device by a land line or cable or by a radio link. In the case of a construction as shown in Figure 4 the outputs of the amplifiers 18 and 23 may be transmitted by line or by a radio link to a circuit substantially in accordance with that illustrated in Figure 1 located at a distant receiving station and having a record producing device in the anode circuit of the valve 1. In the case of the construction illustrated in Figure 5, the output of the amplifier 62 could similarly be communicated by line, or cable or by a radio link to a receiving station in which an apparatus as illustrated in Figure 2 is located and similarly with regard to the arrangement illustrated in Figure 6, the output of the amplifier 62 could be communicated to the receiving station in the manner above specified, the assemblage of apparatus shown diagrammatically in Figure 3 being located at the said station.

Similarly, the output of the amplifier 93 in Figure 7 could be employed in the control of a line or radio transmitter and the received signals employed in the control of a record forming device, which may make a final record instead of the intermediate record forming device diagrammatically shown in Figure 7, in which case the line link or radio link would be in effect the equivalent of the leads 94 and 95.

Alternatively, the current from the relays may be transmitted by line or radio to the receiving station and there employed in the operation of a record producing device which may make an intermediate or a final.

Figure 8:
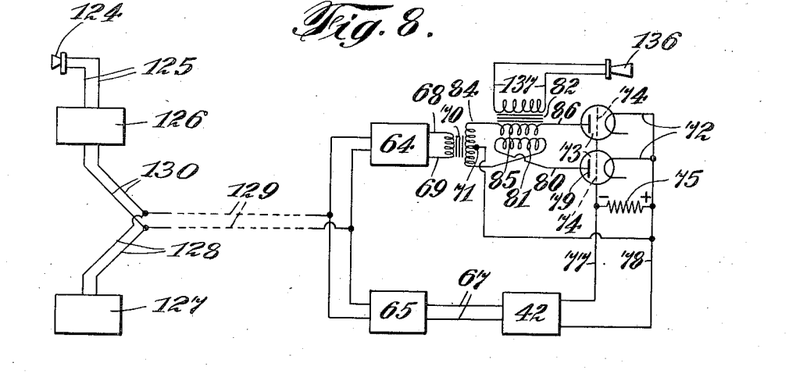
Figures 8 and 9 are circuit diagrams illustrative of the application of the invention to telephony.
Figure 9:
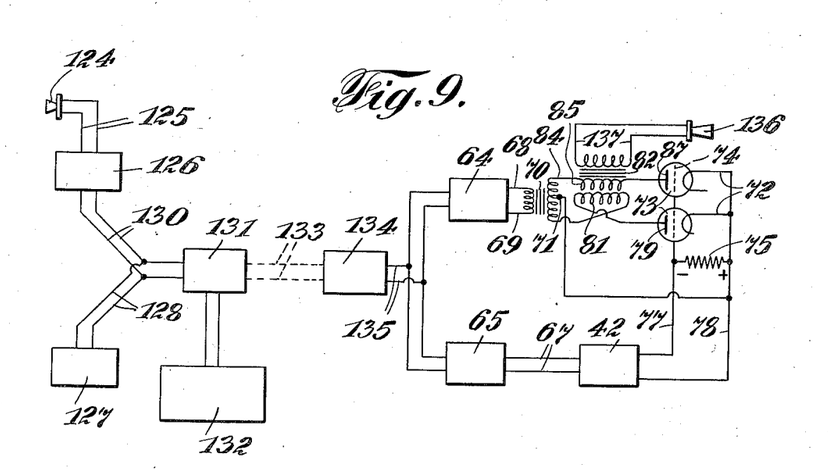

Referring to Figures 8 and 9, which illustrate the application of the invention to telephony, 124 indicates diagrammatically a telephone transmitter connected by leads 125 with a speech amplifier 126, while 127 is a constant amplitude oscillator connected, in the case of the arrangement illustrated in the figure, by the leads 128 with a telephone line 129, the speech amplifier in this case being connected thereto by the leads 130.

In the case of the construction shown in Figure 9, the leads 130 from the speech amplifier and the leads 128 from the constant amplitude oscillator are connected to a modulator 131 and to the modulator also is connected a carrier frequency generator 132. The modulated carrier wave is communicated by the wireless or cable link connected by the leads 133 in this construction to a carrier frequency rectifier 134 located at the receiving station and the output from the carrier frequency rectifier is supplied by the lead 135 to an apparatus which is substantially as illustrated in Figure 3, while in the case of the construction shown in Figure 8, the line current is delivered to such an apparatus and in both Figures 8 and 9, like references are used to denote the parts thereof corresponding with the several elements of the arrangement shown in Figures 3 and 6.

It will, however, be observed that the output leads from the transformer 82 are connected, in the case of the construction illustrated in Figures 8 and 9, with a telephone receiver 136, the leads thereto from the transformer being indicated by the reference.

With regard to the arrangement illustrated in Figure 6, it may be pointed out that a similar result as would be obtained by the arrangement shown therein may be secured if the lead from the filter 64 were connected to the transformer 92, the record forming device being connected with the transformer 70.

Figure 10:
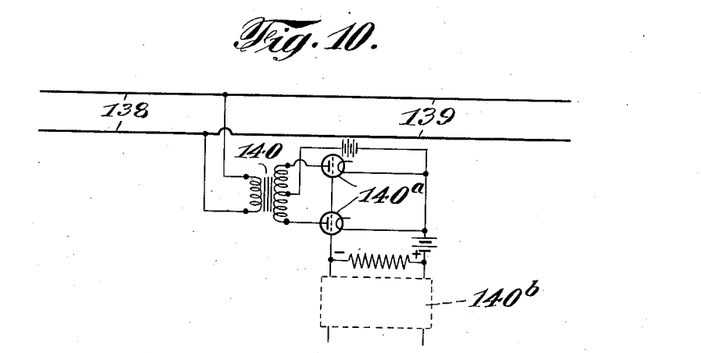
Figures 10, 11 and 12 illustrate further applications of the type of construction illustrated in Figure 2.
Figure 11:
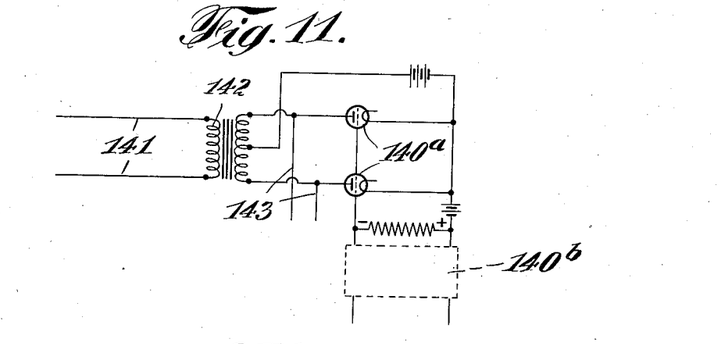
Figure 12:
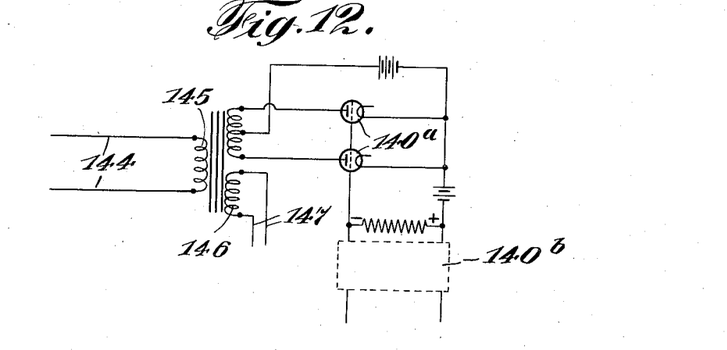

Figures 10, 11 and 12 as above indicated illustrate some further applications of the circuit illustrated in Figure 2 and in such of these figures, as in Figure 2, a centre-tapped secondary of an input transformer 140 is connected at its outer ends with the plates of a pair of valves 140a, and a rectifier 140b is provided from which current is applied between the grids of the valves which are connected together and the filaments which are also connected together.

In the construction illustrated in Figure 10 the input leads 138 connected with the first source of current and the output leads 139 are connected in parallel with the two ends of the primary of the input transformer 140.

In the construction illustrated in Figure 11 the input leads 141 connected with the first source of current are connected with the two ends of the primary 142 of the input transformer and the two leads 143 of the output are connected with the two outer ends of the centre-tapped secondary of the input transformer, while in the construction illustrated in Figure 12, the input leads 144 of the first source of current are connected with the primary 145 of the input transformer and the latter is provided in addition to the centre-tapped secondary with a further secondary 146 with the two ends of which the output leads 147 are connected.

The drawings herewith submitted are diagrammatic in character in order that the essence of the invention may be emphasized. It is to be understood that throughout the several electrical circuits, batteries or other proper sources of electrical energy are provided although these obvious devices of the electrical art are not always specifically illustrated in the diagrams of the circuits. It is also to be understood that in connection with the circuits shown in Figs. 4, 5, 6 and 7, standard well known receiving instruments may be utilized such as, for example, the standard mechanisms disclosed in United States Bartholomew et al. Reissue Patent No. 17,793, September 2, 1930.

It may here be pointed out that the detailed description is furnished for the purpose of illustration and where it has been indicated that the record forming device is of a character adapted to form an intermediate record it will be understood that a record forming device adapted to produce a visual representation of the original may be employed instead.

Generally where the apparatus as illustrated in Figures 4 to 7 is located at a transmitting station, the device 28 will be a device adapted to form an intermediate record for use in the control of telegraphic or telephonic transmitters of known character but it is to be understood that nothing herein is to be regarded as limiting the invention to methods of photo-telegraphy involving the formation or production of such an intermediate record.

Having now particularly described and ascertained the nature of our said invention and in what manner the same is to be performed, we declare that what we claim is:—

1. An apparatus of the class described comprising a pair of triode valves, a transformer having a center-tapped secondary, means connecting the filaments of said valves with the center-tap of said secondary, a second transformer being provided with two primaries, one end of said secondary being connected with one of said primaries of the second transformer and the other end of said secondary being connected with one end of the other primary, the remaining end of one primary being connected with one plate of one valve, the remaining end of the second primary being connected with the plate of the other valve, means to supply direct current to the filaments and grids of said valves, the secondary of the second transformer comprising the output from said device.

2. In an apparatus of the class described, an original adapted to be scanned, a source of light, means to project a beam of light rays from said source to said original, and means to cause a relative movement between said original and said beam whereby said beam scans said original, a light sensitive electric cell, means to project on said cell the reflection of the beam of light from said original, a second light sensitive electric cell, means for projecting a beam of light from said source of illumination to said second cell, means to supply electrical energy to said cells, means to cause the output of the first mentioned cell to be an oscillating current modulated in accordance with the light values of said original, means to cause the output of the second mentioned cell to be an unmodulated oscillating current of a different basic frequency, a recording device, and means adapted to operate said recording device according to the variation of the ratio of the electrical energies flowing through said cells.

3. A method of the class described comprising providing a source of light, interrupting a direct beam of light from said source at a predetermined frequency, projecting a second beam of light from said source and interrupting said second beam at a different predetermined frequency, causing the second beam of light to scan an original, establishing oscillating electrical currents in accordance with values of intensities of said direct beam and said scanning beam as modified by the original, and operating a recording device by the geometrically comparative variations of said electrical currents.

4. The method of making an intermediate record for picture transmission comprising utilizing a single source of light supply to produce a plurality of independent beams of light, certain of which are substantially of non-variable intensity and others of which vary in accordance with the light values of unit areas of the picture to be transmitted, transforming the light values of said beams into electrical currents of different basic frequency characteristics and of intensity characteristics corresponding to said beams, transforming said currents into a single variable current corresponding to the relative variation between said currents, and operating an intermediate recording device by said final current whereby variations of said original light source do not affect said recording device.

5. An apparatus for preventing variations in an initial source of electricity from being carried into a received modulated current comprising: a source of electrical energy; means to produce an unmodulated current of one basic frequency characteristic from said source of energy, the magnitude of the current being influenced by variations in said initial source; means to produce from the same source of energy a modulated current of a different basic frequency characteristic, the mean magnitude of the modulated current being similarly influenced by variations in said initial source; and devices to produce a modulated output current in accordance with the geometrically comparative variations between said modulated current and said unmodulated current.

6. Means to produce from a single source of electrical energy in a single electric circuit currents of different frequencies, the magnitude of the currents varying with variations in said source; and means to produce in an output circuit a current which varies in accordance with the ratio of the currents of said frequencies in the first circuit.

7. In apparatus pertaining to the transmission of pictures, means including a photo-electric cell to produce a carrier current of one fundamental frequency modulated in accordance with light values of elemental areas of an original, means including the same photo-electric cell to produce an alternating current of different fundamental frequency, and means to produce a third current which fluctuates substantially in accordance with the ratio of the first two currents.

8. In apparatus pertaining to the transmission of pictures, means including a photo-electric cell to produce a carrier current of one fundamental frequency modulated in accordance with light values of elemental areas of an original, means including the same photo-electric cell to produce an alternating current of different fundamental frequency, and means to produce a record substantially in accordance with the ratio of the first two currents.

9. Apparatus pertaining to the transmission of pictures comprising: means to establish two beams of light and project them on the same photo-electric cell, an original in the path of one beam of light, means to advance the original relative to the beam to cause successive elemental areas thereof to influence the beam of light striking it, means to chop the beams of light at different frequencies whereby the photo-electric cell forms current of two fundamental frequencies, and means to produce a record substantially in accordance with the ratio of the two currents.

10. Apparatus pertaining to the transmission of pictures comprising: a single source of light, means to establish two beams of light from said source and project them on the same photo-electric cell, an original in the path of one beam of light, means to advance the original relative to the beam to cause successive elemental areas thereof to influence the beam of light striking it, means to chop the beams of light at different frequencies whereby the photo-electric cell forms currents of two fundamental frequencies, and means to produce a record substantially in accordance with the ratio of the two currents.

11. Apparatus pertaining to the transmission of pictures comprising: a single source of light, means to establish two beams of light from said source and project them on the same photo-electric cell, an original in the path of one beam of light, means to advance the original relative to the beam to cause successive elemental areas thereof to influence the beam of light striking it, means to chop the beams of light at different frequencies whereby the photo-electric cell forms currents of two fundamental frequencies, a single transmission path to transmit the two currents, and means to produce a record substantially in accordance with the ratio of the two transmitted currents.

HARRY GUY BARTHOLOMEW.
JOHN WILLEY DALTON.